United States Patent [19]

Iseli

[11] Patent Number: 4,938,104
[45] Date of Patent: Jul. 3, 1990

[54] APPARATUS FOR FACILITATING THE MACHINING OF WORKPIECES

[75] Inventor: Benno Iseli, Schotz, Switzerland

[73] Assignee: Iseli & Co. AG, Schotz, Switzerland

[21] Appl. No.: 301,325

[22] Filed: Jan. 24, 1989

[30] Foreign Application Priority Data

Jan. 25, 1988 [CH] Switzerland .................. 00244/88

[51] Int. Cl.⁵ ............................................. B23D 63/14
[52] U.S. Cl. ........................................... 76/40; 76/42;
51/116; 51/111 R
[58] Field of Search ................. 51/116, 111 R; 76/40, 76/37, 42, 43

[56] References Cited

U.S. PATENT DOCUMENTS

| 1,844,330 | 2/1932 | Medholdt | 51/58 |
| 4,098,149 | 7/1978 | Wright | 76/40 |
| 4,750,387 | 6/1988 | Swiger | 76/37 |
| 4,823,649 | 4/1989 | Emter | 76/42 |

FOREIGN PATENT DOCUMENTS

| 1427108 | 3/1969 | Fed. Rep. of Germany | 76/40 |
| 44-15879 | 6/1969 | Japan | 76/37 |
| 46-05356 | 9/1971 | Japan | 76/37 |
| 0005211 | 1/1980 | Japan | 76/37 |

Primary Examiner—Robert Rose
Attorney, Agent, or Firm—Barnes & Thornburg

[57] ABSTRACT

To gain access to the cutting edge of a saw tooth in the direction of both the back and the front face of a tooth in a single grinding process, the grinding tools (27,37) are adjustable in relation to both their respective pivoted arms (2,3) and with them relative to the machine frame (11,12). Only the primary pivoted arm (2) is driven up and down by a drive (43), pivoting the secondary arm (3) with it by a drive joint (6). Because the pivot axes of pivoted arms (2,3) are not parallel, a universal coupling (6) must be used. This drive joint (6) is offset relative to the pivot axles (32) upwardly from the saw-blade guide (13) in the plane (14) of the saw-blade. Thereby with an otherwise identical device wide or larger-diameter saw blades can be ground.

13 Claims, 4 Drawing Sheets

APPARATUS FOR FACILITATING THE MACHINING OF WORKPIECES

BACKGROUND OF THE INVENTION

This invention relates to apparatus for facilitating the machining i.e., grinding of predetermined regions of workpieces and particularly to the grinding of the side faces or flanks of saw blades in their tooth tip area.

THE PRIOR ART

Machines are known which are adapted to machine i.e., grind both side faces of tooth tips of a saw blade (whether circular or straight) so that the requisite grinding of the side faces of each tip is effected in a single operation. After the grinding operation the tooth tip is broadest at its leading i.e., cutting edge and diminishes in width from the leading edge towards the rear face of the tip, and also, frequently, such that the tip tapers from the top face thereof towards the bottom face.

Such known forms of machines have been found to involve the inherent limitation that the size of workpieces i.e, the depth of a band saw and/or its blade thickness whose tips can be ground are unnecessarily restricted by the construction of conventional drive arrangements for the grinding wheels involved.

In practice, overcoming such limitations has required the use of larger and thus more expensive machines, and because of the greater mass of moving or reciprocating parts of the larger machine it has been necessary to operate the machine more slowly thereby impairing production capability for the machine.

OBJECTS OF THE INVENTION

It is an object of the present invention to avoid the disadvantages of the known machines without forfeiting any useful features thereof.

A particular object is to provide improved apparatus for the machining of hard material tips provided on the teeth of saw blades.

STATEMENTS OF THE INVENTION

According to a first aspect of the invention there is provided apparatus for machining a workpiece such as grinding the flanks of teeth of a saw-blade in the tip area of the teeth, the apparatus being provided with a saw-blade guide extending in a feed direction parallel to a predetermined workpiece such as a saw blade plane of the machine and having two pivoted arms for carrying the tools of the machine, one such tool being located on each side of the saw-blade plane, the arms being arranged for synchronous pivotable displacement between a rest position and a working i.e., grinding position about pivot axes extending transversely to the saw-blade plane and the arms being mounted for angularly adjustability with respect to said plane, characterised in that both said pivoted arms are supported with respect to the remainder of the apparatus by support means located to one side of said plane, and in that any operational connection between the two pivoted arms is so mounted from the support means as to be located remote from the region occupied by a blade on the machine.

Conveniently, each tool is mounted by a tool shaft carried from an associated pivoted arm in such manner that the tool shafts extend transversely to the saw-blade plane with each tool shaft being angularly adjustable relative to the associated pivoted arm, and in that the tool shaft is rotatably drivable from drive means carried by the associated arm.

In a preferred construction, one of the pivoted arms is directly drivable by means for cyclically raising and lowering the arm between its rest position and its working position, and the other pivoted arm is connected to be synchronously pivotable by a pivotal action transmission means or joint from the one pivoted arm.

Preferably, the joint inter-coupling the two pivoted arms is offset relative to the two pivot axes of the pivotal arms in a direction extending away from the sawblade guide.

Preferably, the pivotal action transmission means has two non-identical parts, one of which is formed with a tongue section providing a projecting tongue and the other as a groove section providing a groove engageable by the tongue in such manner as to allow relative angular displacement of the interengaging tongue and groove whilst allowing virtually no play between the tongue and groove.

Conveniently, the tongue has in cross section a part cylindrical portion connecting with a neck part narrower in width relative to the cylindrical portion of the tongue, and the groove has a width matching the diameter of the cylindrical portion of the tongue.

Preferably, each of the two sections of the transmission means or joint is rigidly connected to its respective pivoted arm by an offset producing element connected to it.

In a preferred construction of the apparatus of the invention the pivot axes of the pivoted arms or their notational extensions pass through the tongue or groove respectively, or through their notational radial extensions.

As a result of the offset arrangement of the pivotal action transmission means or joint more space is provided for the handling of saw-blades while the other dimensions of the apparatus remain the same, irrespective of whether a circular or straight blade is to be ground.

With the preferred embodiment of the transmission means or joint no additional problems arises from operational play in the drive joint, so that the precision of the device is not impaired by the offset.

With the apparatus of the invention a beneficial result is achieved that as the pivot axes of the pivoted arms pass through the tongue or the groove respectively, favourable conditions for the movement of the pivoted arms are enabled throughout their intended range of movement.

BRIEF DESCRIPTION OF THE DRAWINGS

Further details of the invention will emerge from the following exemplary discussion of the purely schematic drawings of one embodiment of the invention in which.

DESCRIPTION OF THE PREFERRED EMBODIMENTS

Figure 1:
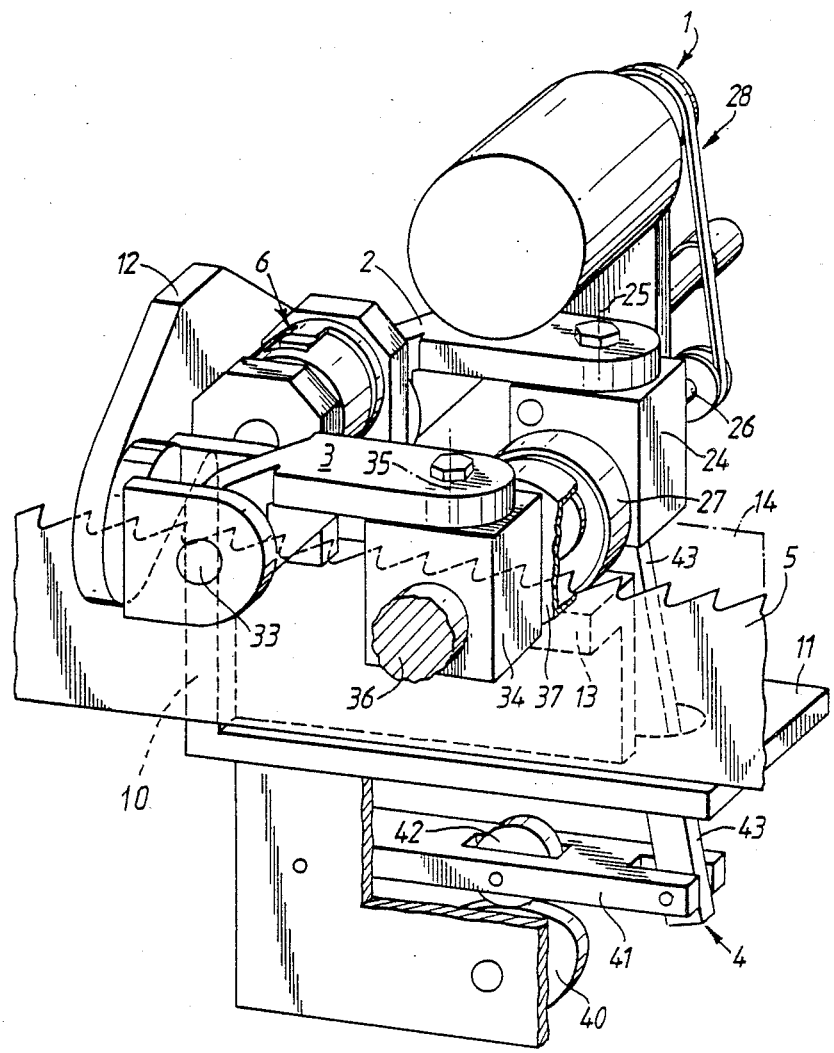
FIG. 1 shows a partial view of apparatus according to the the invention, the Figure for the purposes of clarity omitting the drive to one of the two grinding wheels involved and arrangements for indexing the blade through the grinding region.

Referring now to the drawings the apparatus 1 of the invention is mounted to the frame 11 of a machine provided with a guide plate 13 for guiding a workpiece i.e., portion of band saw 5, during which only a fragmentary portion is indicated, such that the guided length aligns with a saw blade plane 14 of the machine which serves to define the position for the blade 5 during grinding operations on the teeth tips.

A support i.e., yoke plate 12 is supported from the frame 11 above a blade 5 by support means 10 located to one side of the plane 14 such that the yoke plate 12 bridges or overhangs the saw blade guide 13 and extends to either side of the saw plane 14.

Two bearing shaft carrying fork members 21,31 are mounted from the yoke plate 12 at positions one to each side of the blade plane 14. The forks 21,31 are clampably pivotable with respect to the yoke plate 12 in such manner that their orientation about horizontal axes 22,32 can be selectively adjusted and such that once adjusted they can be clamped into the adjusted setting. A primary pivot arm 2 is pivotally mounted to the fork 21 by way of a shaft 23 rotatable in its fork 21 so that it is rotatable with respect to the fork and so that the arm 2 which is connected to the shaft correspondingly rotates the associated shaft 23. A secondary pivot arm 3 is similarly pivoted with respect to the fork 31 by way of a shaft 33. It will be noted that the support 10 for the forks is totally located to one side of the saw plane 14.

Figure 3:
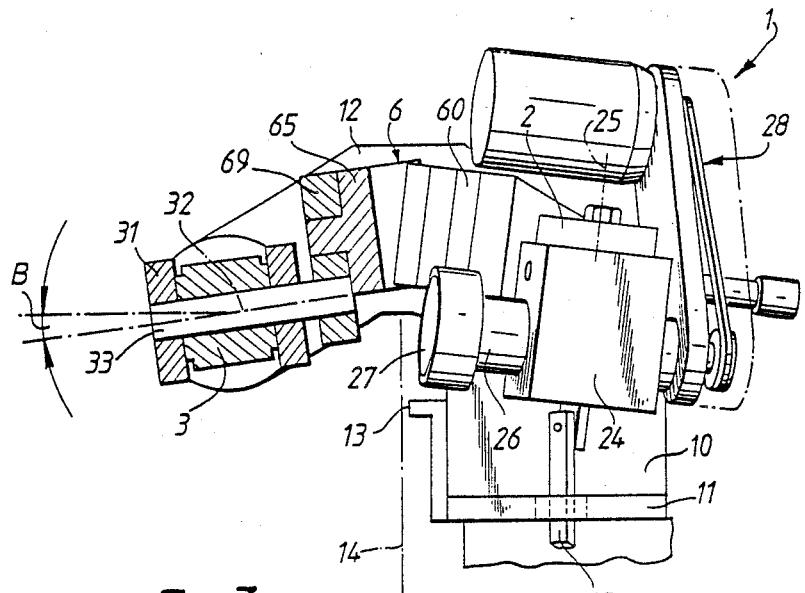
FIG. 3 shows a section through line III—III in FIG. 2, the lower part of which is cut-off: as compared to FIG. 1.

Since the bearing forks 21,31 are pivotable relative to a yoke 12, the shafts 23,33, and, therefore, the pivoted arm are correspndingly positionally adjustable. The extent of pivotal movement is represented by the angle B of FIG. 3.

Figure 2:
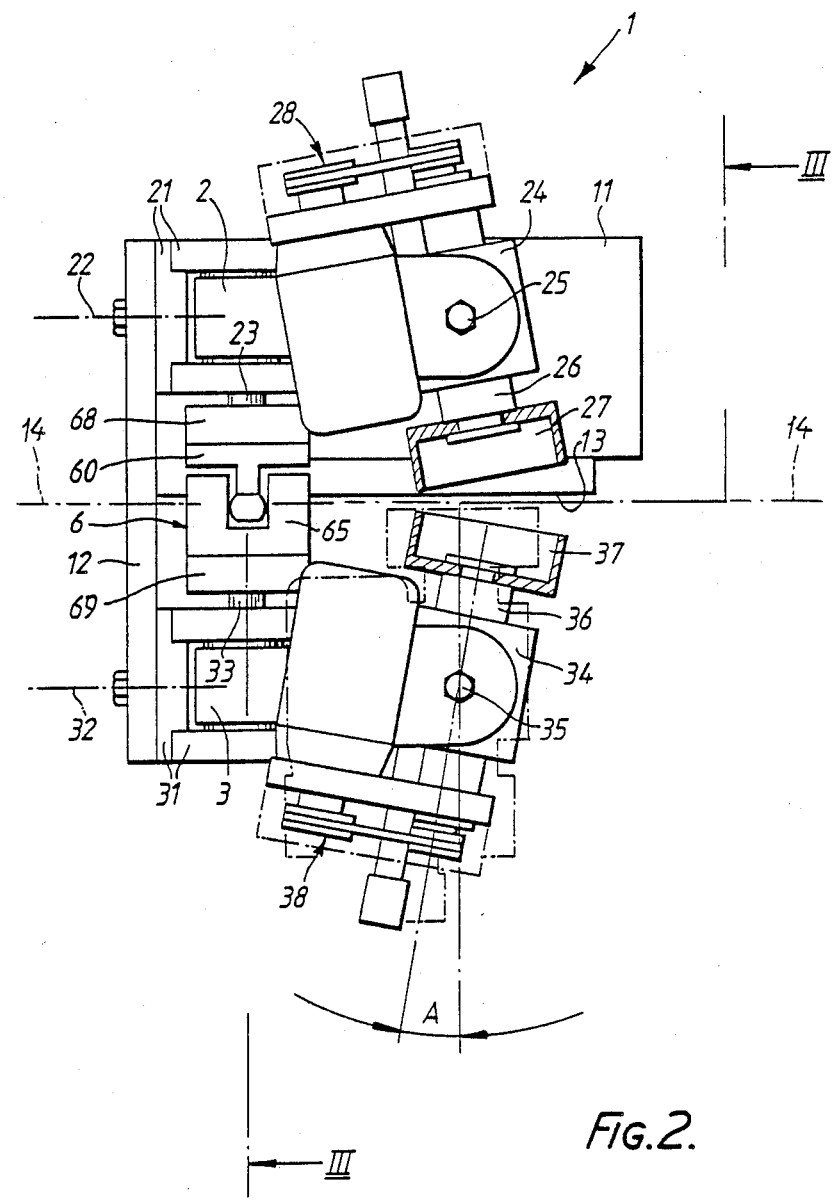
FIG. 2 shows a top view of part of the apparatus represented by FIG. 1.

Tool i.e, grinding wheel support shafts 26, 36 are respectively carried by tool bearing blocks 24, 34 respectively pivotally mounted for adjustment rotation about axes 25,35. The blocks 24,34 are connected to the free ends of the pivoted arms 2,3 so that the pivot axes are similarly spaced from the pivot axes of the arms 2,3. The connection between the bearing blocks and the pivot arms 2,3 is such the axial direction of the drive shafts 26,36 for the grinding wheels 27,37, are adjustable over an angular range of, for example, 'A' degrees (cf FIG. 2) relative to the saw blade plane 14.

After a required adjustment the bearing blocks 24,34 can be clamped against displacement relative to the associated pivot arms 2,3.

Each grinding wheel 27,37 is individually drivable by an associated drive 28,38 (FIG. 2) including a motor, drive pulleys and an associated transmission belt.

In order to perform the requisite machining i.e., grinding operation it is necessary to be able to rock i.e., tilt the pivoted arms up or down as required so that the grinding wheels 27,37 can be moved towards or away from the tips of blade 5 to be ground.

According to a feature of the invention this rocking movement is effected by providing means 4 for imparting a direct drive to one of the pivoted arms namely the arm 2, and to transmit the rocking movement of the primary arm 2 to the secondary arm 3 by way of a pivotal movement transmission joint 6. Since the grinding operations are required to be effected upon successive tips the synchronous tilting of the arms has to be effected cyclically i.e., the grinding wheels have to be alternately moved simultaneously towards the tip to be ground and after grinding moved away from the ground tip to enable a succession of tips to be advanced to the grinding position.

This direct drive arrangement 4 is located to primary arm side of the saw blade plane 14 in such manner that it does not impede the positioning of a saw blade into operational cooperation with the guide plate.

The direct drive arrangement 4 includes a push rod 43 flexibly i.e., pivotally connecting at one end with the bearing block 24 and at the other end with an oscillating arm 41 pivotally connected to the frame 11. The arm 41 carries a roller 42 which serves as the follower for a cam 40 mounted in a bearing (not shown) in the machine frame 11 and driveable by a motor (not shown). The movement of oscillating arm 41 is transmitted directly to primary pivoted arm 2 by a push-rod 43.

As mentioned the primary pivoted arm 2 is connected with minimum play to the secondary pivoted arm by the pivotal movement transmission or coupling means 6.

Figure 4:
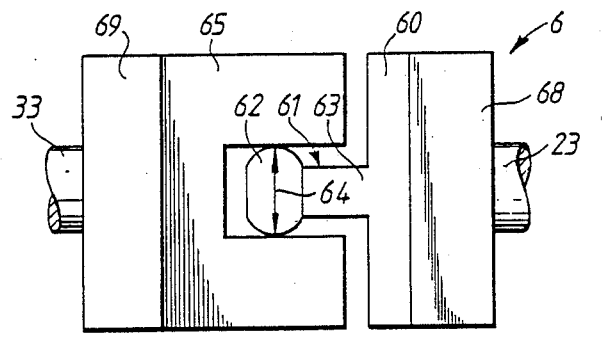
FIG. 4 shows an enlarged top view of a detail of a coupling used in the apparatus of FIGS. 1 and 2.
Figure 5:
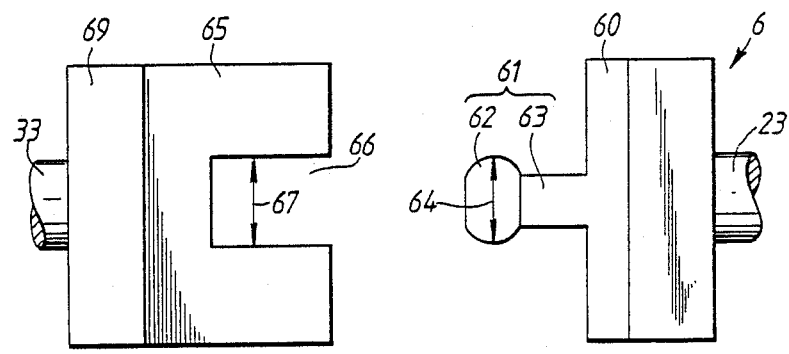
FIG. 5 shows a top view o the separated parts of the joint corresponding in principle to FIG. 2.
Figure 6:
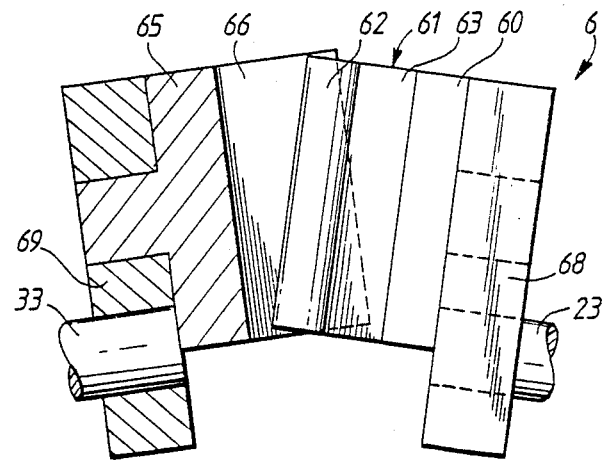
FIG. 6 shows an enlargement of the joint from FIG. 3, roughly on the scale of FIGS. 4 and 5.

As may be particularly seen from FIGS. 4 to 6 the coupling means 6 essentially includes a tongue and groove connection which allows relative angular displacements between the tongue and groove connection. To this extent the connection is broadly speaking a universal coupling. In the particular arrangement shown the coupling means 6 thus includes a tongue providing section 60 and a groove providing section 65 which interengage to form a flexible relatively pivotable connection with each other. The tongue section 60 includes a tongue 61 consisting of a cylindrical tongue head 62 (it is partly flattened) on a neck 63 which engages in groove 66 of the groove section 65.

The diameter 64 of the cylindrical tongue head 62 corresponds with a high degree of precision to the width 67 of the groove 66, so that play between the tongue head and groove is reduced as much as possible compatible with clearance to effect operational relative movements. It will be apparent (from FIGS. 4 to 6 in particular) that, because of the rounded form of the tongue head 62, within certain limits the two joint sections 60, 65 can pivot and slide relative to each other without play arising in the drive.

Both drive parts 60,65 are mounted to the respective pivoted arm shafts 23,33 by offset producing attachment elements or pieces 68,69, in such a way that drive coupling means 6 is offest relative to the shafts 23,33 in the direction extending away from the saw-blade guide 13 in the direction of saw-blade plane 14. This configuration makes it possible for the machine to be able to accommodate, as compared with known machines, broader straight saw blades or circular saw-blades of larger diameter.

The feed i.e., indexing of the saw blades can be effected by known means.

Figure 7:
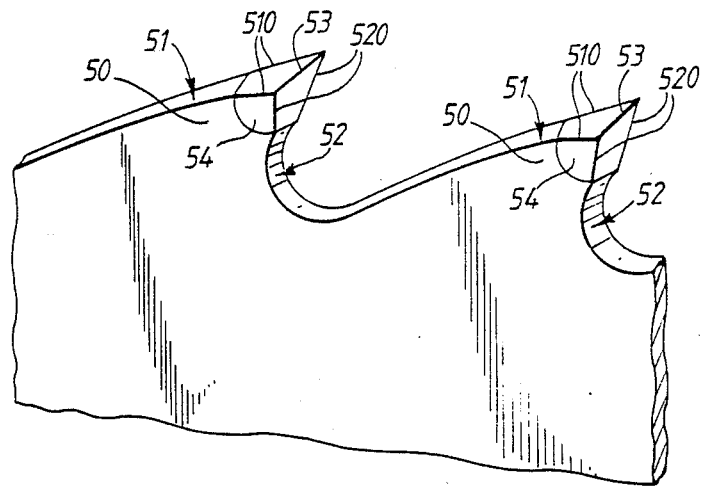
FIG. 7 is a fragmentary schematic illustration of the ground tips of a saw blade.

The saw blade illustrated in FIG. 7 has on each tooth a back face 51 and a front face 52 and a cutting edge 53 of hard material 54. When grinding with the machine described, the cutting edge 53 can be exposed not only obliquely relative to back face 51 along back edges 510, but also along the oblique face edges 520, a process which can be effected by an appropriate setting within the angular adjustment ranges B and A.

It will be apparant from the description that the adjustments of the grinding wheel settings relative to the saw blade plane 14 allows teeth 50 to be ground more or less obliquely with regard to the tooth face edges 520 and thereby to grind cutting edge 53 more in this respect, and thereby to gain more or less access to cutting edge 53 in this respect.

The above described apparatus is utilisable in the following manner. A saw blade is mounted in the machine, the blade being supported by the plate 11 and other supports (not shown) so that the blade cooperates with the guide plate 13.

It will be assumed that both side faces of the blade tips are to be machined in an identical manner with the side faces of each tip tapering in the direction rearwards from the tip front face and also tapering in the downwards direction from the tip top face. To obtain this double tapering it is necessary to set the working faces i.e., grinding planes of the grinding wheels such they are operationally parallel to the required planes of the tip side faces.

To achieve this it is necessary to effect two main adjustments firstly the inclining of the grinding wheels so that they are inclined towards each other in the direction downwardly of the top to bottom of the tips to be ground, and secondly so that they are additionally inclined towards each other in the front to rear direction of the tips to be ground. The first adjustment is effected by pivoting the forks so that the shafts 23,33 of the pivoted arms 2,3 are inclined to the horizontal. The inclination corresponding to the required tapering of the tip side faces in the associated direction. The second adjustment is effected by rotating the shaft support blocks 24,34 with respect to the pivoted arms 2,3. As mentioned following these adjustments the forks and blocks are clamped in the adjusted positions.

As has been mentioned as it is required to rock the two pivot arms 2,3 together a displacement transmission or coupling means 6 is provided for such displacement transmission. By providing the tongue and groove method of interconnection in the coupling means the coupling means is able to accommodate the relative angular displacement of the pivot arm shafts 23,33.

Furthermore, since the interengaging portions of the displacement transmission are located to one side of the axes of the shafts in the direction away from the location of the saw blade on the machine the working space available for the saw blade is not impeded by the provision of the displacement transmission, thereby greatly facilitating loading and unloading of a blade.

It will be appreciated that with the apparatus construction of the invention all of the support and drive arrangements for the grinding wheels are located to one side only of the saw blade above, and in addition the pivotal action transmission 6 is totally offset i.e., located outwardly of the pivot axes but such that the axes of these shafts or the projections of such axes pass through the coupling means. With this positioning of the joint 6 the pivot arms carrying the grinding wheel assemblies do not encroach upon the working space for the saw blade etc., whereby this space is not impeded thereby enabling the grinding of deeper blades as compared with those possible by a similarly sized machine not incorporating the features of the invention. In addition, the provision of the offset positioning for the transmission 6 makes it is possible to accommodate greater angular separation variation for the grinding wheels when in their retracted positions than that possible with said similarly sized machines so that thicker blade tips can be machined as compared with the machining thickness possible similarly sized machines.

I claim:

1. Apparatus for machining a workpiece with a plurality of tools, the workpiece comprising a saw-blade having teeth with flanks in a tip area of the teeth, the apparatus comprising a saw-blade guide extending in a feed direction parallel to a predetermined saw blade plane of the apparatus, two pivoted arms for carrying the tools of the apparatus, therebeing one such pivoted arm located on each side of the saw-blade plane, the arms being mounted for an angular adjustability with respect to said plane, support means located to one side of said plane for supporting both said pivoted arms with respect to the remainder of the apparatus, and coupling means located remote from the region occupied by a blade on the apparatus for enabling synchronous pivotable movements of the two arms between a rest position and a working position about pivot axes extending transversely to the saw-blade plane and the arms.

2. Apparatus as claimed in claim 1 further comprising carrying means connected to each pivoted arm for carryin one of the tools including a tool shaft carried by each carrying means in such a manner that the tool shafts extend treansversely to the saw-blade plane with each tool shaft being angularly adjustable relative to the associated pivoted arm, and means for enabling each tool shaft to be rotatably drivable from drive means carried by the associated arm.

3. Apparatus as claimed in claim 2 further comprising means for cyclically raising and lowering a first one of said pivoted arms between a rest position and a working position, the coupling means transmitting the cyclical action to the other one of the pivoted arms such that the two arms move in synchronism with each other.

4. Apparatus as claimed in claim 3 wherein the coupling means is positioned offset relative to the two pivot axes of the pivoted arms in a direction extending away from the saw-blade guide.

5. Apparatus as claimed in claim 4 wherein the coupling means comprises two non-identical parts.

6. Apparatus as claimed in claim 4 wherein the coupling means comprises a tongue and groove arrangement.

7. Apparatus as claimed in claim 6 wherein the tongue has in cross section a part cylindrical portion connecting with a neck part narrower in width relative to the cylindrical portion of the tongue, and the groove has a width matching the diameter of the part cylindrical portion of the tongue.

8. Apparatus as claimed in claim 5 wherein each of the two non-identical parts of the coupling means is rigidly connected to its respective pivoted arm by an offset producing element.

9. An apparatus for machining a saw blade comprising:
a frame and guide means fixed to the frame for guiding a saw blade in a predetermined plane;
a yoke, and support means located to one side of the predetermined plane for supporting the yoke, the yoke extending across the predetermined plane;
a pair of axis-defining means adjustably fixed to the yoke on opposite sides of the predetermined plane for defining a pair of pivot axes extending generally transverse to the predetermined plane;

a pair of arms, each arm pivotally connected to one of the axis-defining means, a pair of machining tools and a carrying means adjustably fixed to each of the arms for carrying the machining tools; and coupling means for synchronously pivoting the arms and connected machining tools about the pivot axes on opposite sides of the predetermined plane.

10. The apparatus of claim 9 wherein each axis-defining means comprises a fork including a pair of legs and a shaft extending between the legs, each fork being adjustably clamped to the yoke and one of the pair of arms being coupled to each shaft.

11. The apparatus of claim 9 wherein each carrying means comprises a bearing block adjustably fixed to one of the pair of arms, a drive shaft carried by the bearing block, the machining tool being coupled to the drive shaft.

12. The apparatus of claim 11 further comprising motor means carried by the carrying means and coupled to the drive shaft for driving the machining tool.

13. The apparatus of claim 9 further comprising means for cyclically raising and lowering a first of the pivoted arms, the coupling means transmitting the cyclical action to the other of the pivoted arms such that the two arms move in synchronism with each other.

* * * * *